(12) United States Patent
Wang

(10) Patent No.: US 11,500,645 B2
(45) Date of Patent: Nov. 15, 2022

(54) BOOT METHOD AND ELECTRONIC DEVICE

(71) Applicant: Lenovo (Beijing) Co., Ltd., Beijing (CN)

(72) Inventor: Yahui Wang, Beijing (CN)

(73) Assignee: LENOVO (BEIJING) CO., LTD., Beijing (CN)

( * ) Notice: Subject to any disclaimer, the term of this patent is extended or adjusted under 35 U.S.C. 154(b) by 101 days.

(21) Appl. No.: 16/370,545

(22) Filed: Mar. 29, 2019

(65) Prior Publication Data
US 2019/0303169 A1 Oct. 3, 2019

(30) Foreign Application Priority Data
Mar. 30, 2018 (CN) .......................... 201810295741.5

(51) Int. Cl.
 G06F 9/4401 (2018.01)
 G06F 3/01 (2006.01)
(52) U.S. Cl.
 CPC ............ *G06F 9/4401* (2013.01); *G06F 3/016* (2013.01)
(58) Field of Classification Search
 CPC ............................... G06F 9/4401; G06F 3/016
 See application file for complete search history.

(56) References Cited

U.S. PATENT DOCUMENTS

| | | | | |
|---|---|---|---|---|
| 6,053,047 A | * | 4/2000 | Dister | G01M 13/028 73/593 |
| 2009/0119527 A1 | * | 5/2009 | Kim | G06F 1/3203 713/323 |
| 2010/0229117 A1 | * | 9/2010 | Lee | G06F 3/0482 715/810 |
| 2013/0300713 A1 | | 11/2013 | Gu et al. | |
| 2016/0162002 A1 | * | 6/2016 | Liang | G06F 1/3231 713/323 |
| 2017/0161676 A1 | * | 6/2017 | Aji | G06Q 10/087 |

FOREIGN PATENT DOCUMENTS

| | | | |
|---|---|---|---|
| CN | 104836869 A | * | 8/2015 |
| CN | 104836869 A | | 8/2015 |
| CN | 105357402 A | * | 2/2016 |
| CN | 105357402 A | | 2/2016 |
| CN | 107357425 A | * | 11/2017 |
| CN | 107357425 A | | 11/2017 |
| CN | 107678492 A | | 2/2018 |

* cited by examiner

*Primary Examiner* — Jaweed A Abbaszadeh
*Assistant Examiner* — Hyun Soo Kim
(74) *Attorney, Agent, or Firm* — Anova Law Group, PLLC

(57) ABSTRACT

A boot method is provided for an electronic device. The boot method includes acquiring a boot signal; performing a booting process based on the boot signal; and, based on the boot signal, generating a feedback provided to the boot signal to indicate the booting process.

8 Claims, 2 Drawing Sheets

BOOT METHOD AND ELECTRONIC DEVICE

CROSS-REFERENCES TO RELATED APPLICATIONS

This application claims priority of Chinese Patent Application No. 201810295741.5, filed on Mar. 30, 2018, the entire contents of which are hereby incorporated by reference.

FIELD OF THE INVENTION

The present disclosure generally relates to computer technologies and, more particularly, to a boot method and an electronic device.

BACKGROUND

At present, mobile phones have become popular electronic devices in people's daily lives. However, when a mobile phone is turned on, it generates a trigger signal by pressing a physical power key, thereby powering up the power management module of the mobile phone to start the mobile phone.

When the mobile phone is turned on by a traditional physical key, the user can only feel the positional movement of the physical key when pressing the physical key. The corresponding vibration feedback or other forms of feedback often cannot be provided.

The disclosed methods and systems are directed to solve one or more problems set forth above and other problems.

BRIEF SUMMARY OF THE DISCLOSURE

One aspect of the present disclosure provides a boot method for an electronic device. The boot method includes acquiring a boot signal; performing a booting process based on the boot signal; and, based on the boot signal, generating a feedback provided to the boot signal to indicate the booting process.

Another aspect of the present disclosure provides an electronic device. The electronic device includes a power management chip a feedback component. The power management chip acquires a boot signal and, based on the boot signal, performs a booting process. The feedback component generates, based on the boot signal, a feedback provided to the boot signal to indicate the booting process.

Other aspects of the present disclosure can be understood by those skilled in the art in light of the description, the claims, and the drawings of the present disclosure.

DETAILED DESCRIPTION

In order to make those skilled in the art better understand the technical solutions of the present disclosure, the present disclosure will be described in detail below in conjunction with the accompanying drawings and specific embodiments.

Various aspects and features of the present disclosure are described herein with reference to the accompanying drawings. The features of the present disclosure will become apparent from the following description of the preferred forms of the embodiments which are illustrated as non-limiting examples.

It should be understood that, although the present disclosure has been described with reference to specific embodiments, those skilled in the art can implement many other equivalents of the disclosure, which are within the protection scope of the present disclosure.

Specific embodiments of the present disclosure are described below with reference to the accompany drawings. However, it should be understood that the embodiments are merely examples of the disclosure, which can be implemented in various ways. Well-understood and/or repetitive functions and structures are not described in detail in order to clarify the true intent according to the user's operation history, and to avoid unnecessary or redundant details to obscure the present disclosure. Therefore, the specific structural and functional details of the disclosure are not intended to be limiting, but are merely used as representative bases of the claims to instruct those skilled in the art to use the disclosure in virtually any suitable detailed structures and in various ways.

The present disclosure may use the phrases "in one embodiment", "in another embodiment", "in yet another embodiment" or "in other embodiments". The phrases may refer to one or more same or different embodiments of the present disclosure.

A boot method in one embodiment includes: acquiring a boot signal; according to the boot signal, performing a booting process; and according to the boot signal, generating feedback provided to the boot signal.

As can be seen from above, using the disclosed boot method, on one hand, when the boot signal is acquired, according to the boot signal, the booting process can be performed. On the other hand, according to the boot signal, a feedback is generated and provided to the boot signal, so that in the circumstance that an electronic device such as a mobile phone, a tablet and the like is turned off, the feedback of the boot signal can be provided to the user when the boot signal is acquired from the user.

In order to better understand the above technical solution, the specific flow of the boot method described above will be elaborated below in conjunction with the accompany drawings and specific embodiments.

Figure 1:
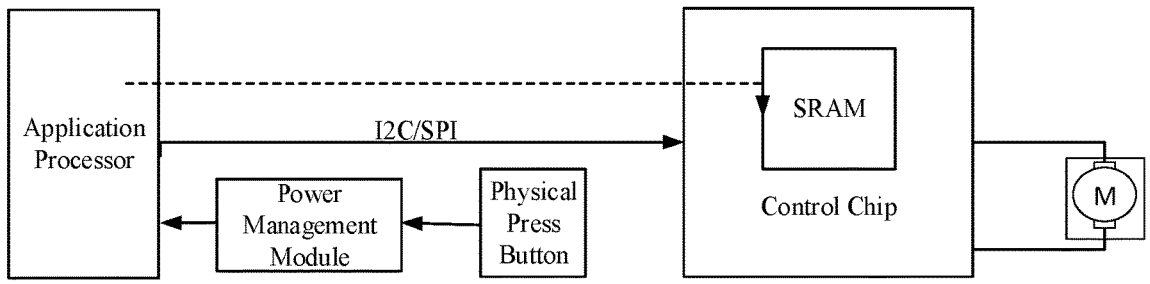
FIG. 1 illustrates a flowchart of a boot method.
Figure 2:
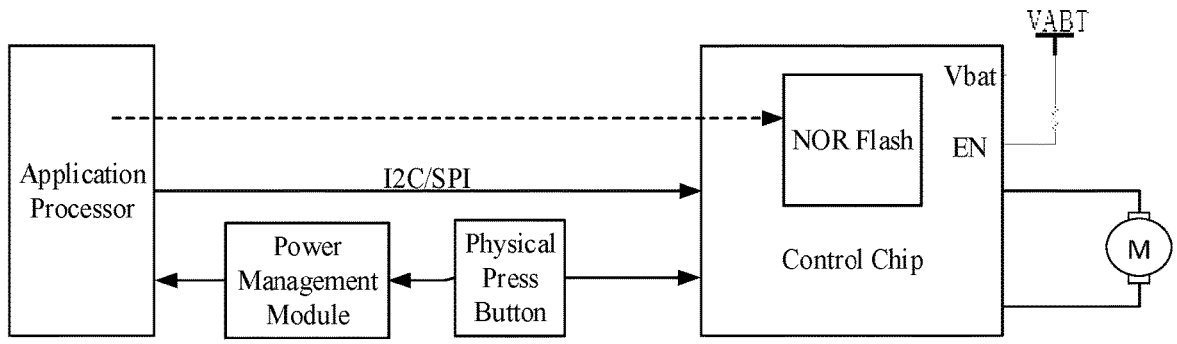
FIG. 2 illustrates a flowchart of a boot method consistent with the disclosed embodiments.
Figure 3:
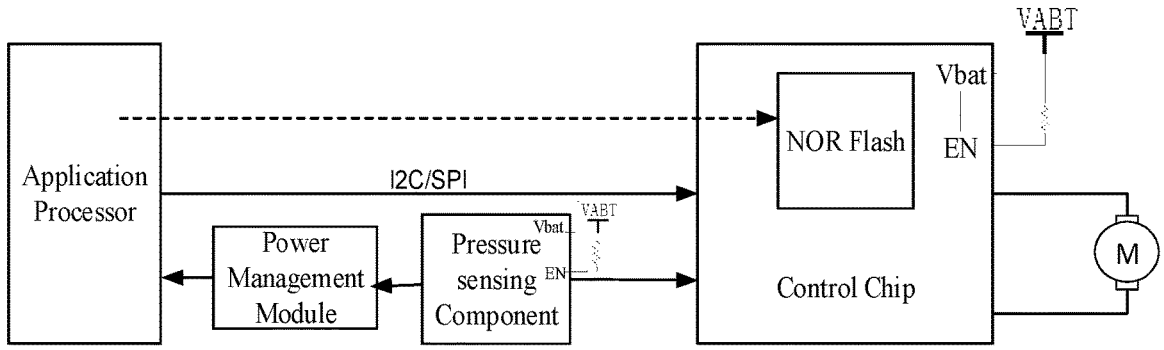
FIG. 3 illustrates a flowchart of another boot method consistent with the disclosed embodiments.
Figure 4:
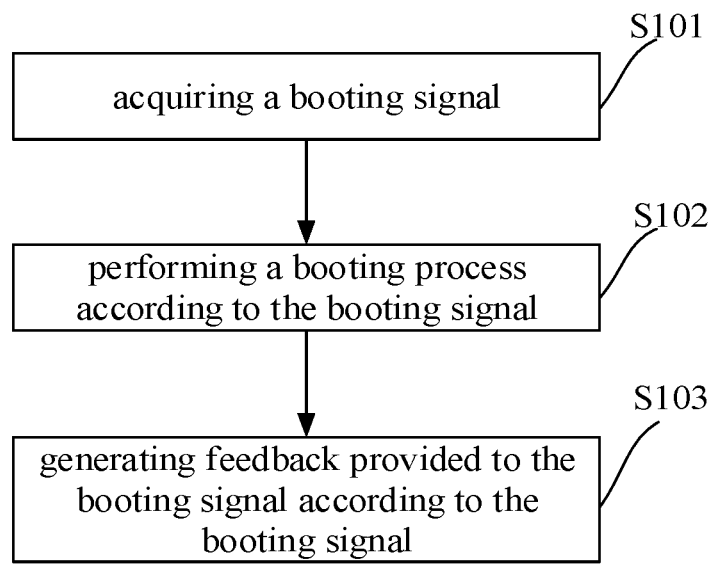
FIG. 4 illustrates a flowchart of yet another boot method consistent with the disclosed embodiments.

FIG. 2 is a flowchart of a boot method consistent with the disclosed embodiments, FIG. 3 is a flowchart of another boot method consistent with the disclosed embodiments, and FIG. 4 is a flowchart of yet another boot method consistent with the disclosed embodiments. The disclosed boot methods can be applied to an electronic device. The electronic device can be a mobile phone, a tablet, etc. As shown in FIG. 2, FIG. 3, and FIG. 4, the method includes the followings.

Step 101: acquiring a boot signal.

The boot signal may be acquired based on the user's operation of the electronic device. The operation may be a pressing on a physical boot key or a virtual boot key or an area on the electronic device. The operation is not limited herein.

When the electronic device is a touch screen mobile phone with a virtual boot key, the boot signal described above may be acquired when the user touches the virtual boot key on the mobile phone and receives the user's touch operation. The touch boot key may be disposed on a side of the mobile phone or at a lower position of the touch screen of the mobile phone. If the mobile phone sets a specific area on the touch screen as the area obtaining the booting operation, the mobile phone may acquire the boot signal when the touch operation performed by the user is acquired in the specific area. In addition, when the boot signal of the mobile phone is acquired, a certain preset condition, such as the length of the pressing time, the magnitude of the pressing force, etc., may be set as the condition of whether it is a booting operation.

Step 102: performing a booting process according to the boot signal.

Specifically, the power management chip acquires the boot signal, and performs the booting process according to the boot signal. That is, after the user performs the booting operation on the electronic device, the power management chip can acquire the boot signal, and perform the booting process according to the boot signal.

In one embodiment, the power management chip operates in the low power mode to enable the booting process to be performed according to the boot signal. If the electronic device having the power management chip is in the power off state, the power management chip directly obtains power from the electronic device battery to support the power management chip to work in the low power mode.

When the power management chip operates in the low power mode, the voltage of the electronic device battery that supplies power to the power management chip is at least 2.8V, where 2.8V is the basic voltage of the low power operation of the power management chip. When the battery is over discharged, after the electronic device is connected to the power supply to charge the battery for a period of time, feedback component can work in the low power state. The battery is charged to at least make the battery voltage reach 2.8V.

In addition, the power management chip operates in the low power mode when the electronic device is in the power off state. Only a small portion of the circuit in the power management chip operates to detect whether there is a boot signal.

Accordingly, when the power management chip is in the normal operational mode, the whole circuit is in the working state. Each working component in the electronic device such as an application processor, an audio chip, etc., is in a power on state.

Step 103: generating a feedback provided to the boot signal according to the boot signal.

Specifically, a feedback component acquires the boot signal and generates the feedback provided to the boot signal. That is, after the user performs the booting operation on the electronic device, the feedback component can acquire the boot signal and generate the feedback provided to the boot signal.

In one embodiment, the feedback component operates in the low power mode so as to wake up and generate feedback provided to the boot signal according to the boot signal. If the electronic device including the feedback component is in the power off state, the feedback component directly obtains power from the electronic device battery to support the feedback component to work in the low power mode.

Similarly, when the feedback component operates in the low power mode, the voltage of the electronic device battery that supplies power to the feedback component is at least 2.8V, where 2.8V is the basic voltage of the low power operation of the feedback component. When the battery is over discharged, after the electronic device is connected to the power supply to charge the battery for a period of time, the feedback component can work in the low power state. The battery is charged to at least make the battery voltage reach 2.8V Conventionally, when a mobile phone performs the booting operation, the booting operation is only performed through the physical boot key. But the corresponding vibration feedback or other forms of feedback cannot be provided. Even some mobile phones with physical boot keys can be operated to provide the user with corresponding vibration feedback or other forms of feedback in the booting state, the mobile phones first receive the user's pressing operation through the physical boot key, and then through the power management module and the application processor, and finally the application processor causes the control chip to control the vibration motor to give corresponding vibration feedback. The entire signal transmission process is too long and cause a longer delay in giving feedback to the electronic device such as the mobile phone and the like.

In one embodiment, as shown in FIG. 2, the enable pin (EN) of the control chip of the vibration motor is pulled up to the VBAT battery power supply pin, so that when the battery is powered on, the control chip can enter the low power standby mode to wait for providing the vibration feedback in time when the boot signal is acquired. Specifically, the enable pin (EN pin) of the control chip is no longer connected to the application processor, but is directly connected to the positive electrode of the battery. Thus, the control chip can directly obtain power from the battery when the mobile phone is powered off. Thus, when the physical boot key component receives the user's operation (such as pressing operation, etc.), the corresponding signal can be directly sent to the control chip of the vibration motor. In return, the vibration motor can directly respond to the corresponding signal and directly give the vibration feedback, so that the feedback is given more quickly.

Specifically, the feedback component has three states. One state is the closed state, where the battery is in the over-discharged state. That is, the battery voltage is less than 2.8V. The current supplied by the battery can reach the driver IC of the feedback component, but the current does not flow into the driver IC. Another state is the enabled state, where the battery current flows into the driver IC, but does not drive the motor rotor to run, so that the driver IC has the condition to control the motion of the motor rotor in response to a control command, and the power consumption of the driver IC is low. The other state is the operational state (normal working state), where the driver IC drives the motor rotor to run according to the preset vibration waveform.

In one embodiment, the feedback component may be a vibration motor. The feedback component operates in the low power mode so as to wake up and generate the feedback provided to the boot signal according to the boot signal. The feedback includes: the control chip of the vibration motor acquiring a boot signal; and the control chip reading the vibration waveform in its own memory according to the boot signal, and driving the vibration of the vibration motor according to the vibration waveform.

The control chip reads the vibration waveform in its own memory according to the boot signal, so that the control chip can read the vibration waveform faster, and the vibration feedback can be transmitted through the vibration motor more directly and quickly.

For a mobile phone with a physical boot key, under the condition that the battery is not over discharged, the user performs the booting operation through the physical boot key. If vibration or sound feedback can be obtained, the audio system and the vibration system of the mobile phone generally provide sound or vibration to prompt the user. The audio system and the vibration system can read the specific output mode stored in the volatile memory of the mobile phone when the mobile phone is turned on, and output the sound or vibration to the user as a prompt in a specific output mode. However, under the condition that the mobile phone is powered off, when the user needs to press the physical boot key, the audio system and the vibration system of the mobile phone have not been activated, and the user cannot be prompted in time. Similarly, after the mobile phone battery is over discharged, the boot key does not give any prompt when the booting operation is performed at the first time. It is because the specific output mode stored in the volatile memory no longer exists, and the audio system and the vibration system cannot read the corresponding output mode.

In certain embodiments, the memory is a nonvolatile memory, so that the vibration waveform is not lost under the condition that the battery voltage is lower than a predetermined voltage. The vibration waveform is written to the nonvolatile memory when the electronic device is turned on at the first time, or the vibration waveform is pre-written to the nonvolatile memory.

The situation in which the battery voltage is lower than the predetermined voltage refers to the situation in which the battery is over discharged. Correspondingly, the use of non-volatile memory (NOR Flash) enables the information stored in the non-volatile memory not to disappear when the battery is over discharged or the electronic device is turned off. That is, in the currently used electronic device such as the mobile phone, the tablet, etc., after the battery is over discharged, the situation that the memory storing the vibration waveform of the vibration motor needs to re-read the vibration waveform is avoided. Often the memory for storing the vibration waveform in the control chip is a static random-access memory (SRAM), which can quickly read and write temporarily stored data. However, after the power is off, the data is lost, and then needs to be re-added after the power is on. That is, after the electronic device is restarted, the application processor in the mobile phone communicates with the control chip of the vibration motor through the I2C or SPI interface, and transmits the vibration waveform to the control chip.

In one embodiment, the pressure sensing component is also capable of acquiring the boot signal. Specially, when the user operates the electronic device, the operation may be a pressing on a virtual boot key or a certain area and the like on the electronic device. The pressure sensing component can acquire the boot signal, and directly send a corresponding signal to the control chip of the vibration motor, so that the vibration motor can directly respond to the corresponding signal and directly give the vibration feedback. Thus, the feedback is given more quickly.

Specifically, the boot signal obtained by the pressure sensing component includes: the pressure sensing component operating in the low power mode to acquire a sensing unit value at the first frequency, wherein if the electronic device with the pressure sensing component is in the power off state, the pressure sensing component obtains power from the electronic device battery to support the pressure sensing component to work in the low power mode; and if the sensing unit value obtained at the first frequency meets the predetermined condition, switching to the operation in the normal operational mode, obtaining the sensing unit value at the second frequency and processing the value to determine the boot signal, wherein the sensing area of the pressure sensing component represented by the predetermined condition has a user's finger.

The pressure sensing component has three states. One state is the closed state, where the current supplied by the battery can reach the pressure sensing component, but the current does not flow into the pressure sensor. Another state is the enabled state, where the current supplied by the battery can flow into the pressure sensing component, so that the pressure sensing component can acquire the sensing unit value at the first frequency. The computing unit is not activated at this time, so that the power consumption of the pressure sensing component is low. The other state is the normal operational state, where the pressure sensing component acquires the sensing unit value at the second frequency, and activates the computing unit to determine whether the sensing unit value obtained at the second frequency meets the condition of the boot signal.

In the above embodiment, the first frequency is smaller than the second frequency. The first frequency acquires the sensing unit value at a longer time interval, and determines whether the value satisfies the predetermined condition, so that the pressure sensing component keeps working in the enabled state with a low power consumption to save power loss.

In the practical application, for example, a tablet is taken as the electronic device. In one case, the pressure sensing component may be a physical boot key disposed on the tablet. When the user presses the tablet boot key, the pressure sensing component acquires a boot signal. Accordingly, when the tablet is turned off, the pressure sensing component existing as the physical boot key acquires the sensing unit value at the first frequency. When the time for the user to press the boot key satisfies the booting condition, the value detected by the sensing unit also enables the pressure sensing component to switch the working states. The pressure sensing component starts to acquire the sensing unit value at the second frequency. That is, the pressure sensing component switches to the normal working state In another case, for example, a mobile phone is taken as the electronic device. The pressure sensing component may be disposed under a virtual key of the mobile phone. When the user presses the virtual key of the mobile phone, the pressure sensing component may detect the pressing operation. If the user can perform the booting operation of the mobile phone by pressing the virtual key, the pressure sensing component may switch the working state when receiving the pressing operation, and acquire the sensing unit value at the second frequency. When the mobile phone is turned off, the pressure sensing component under the virtual key of the mobile phone acquires the sensing unit at the first frequency to avoid loss of energy consumption.

In addition, in the third case, for example, a mobile phone is still taken as the electronic device. The pressure sensing component may be a specific area disposed under the touch screen of the mobile phone. For example, the pressure sensing component can be disposed in one third of the area near the lower portion of the touch screen. The area enables the pressure sensing component to detect the operation when the user presses the corresponding touch on the area. That is, when the mobile phone is turned off, the pressure sensing component detect the pressing operation at the first frequency. When the detected sensing unit value satisfies the preset condition, the pressure sensing component switches to detect the pressing operation at the second frequency.

In one embodiment, performing the booting process according to the boot signal includes: the power management chip controlling the application processor to be powered on to enable the application processor to activate at least one functional component, wherein the at least one functional component does not include the feedback component and the pressure sensing component.

In the practical application, for example, a mobile phone is used as the electronic device. After the power management chip of the mobile phone controls the application processor to be powered on, the application processor activates related functional components in the mobile phone. The functional components do not include the feedback component and the pressure sensing component for providing feedback. The functional components may be signal receiving components of the mobile phone, signal transmitting components of the mobile phone, and installed software such as QQ, WeChat, etc. Meanwhile, when the mobile phone is turned off, the feedback component in the mobile phone and the pressure sensing component directly obtain power from the mobile phone battery to support the feedback component and the pressure sensing component to work in the low power mode. That is, the feedback component and the pressure sensing component are in the enabled state. When the power management chip of the mobile phone controls its application processor to be powered on, it is not necessary to perform the enabling operation on the feedback component and the pressure sensing component again.

Further, in one embodiment, the above boot method also includes: the application processor controlling the feedback component to switch from the low power mode to the operational mode so as to enable feedback of the at least one functional component through the feedback component.

Specifically, using the mobile phone as the electronic device, after the power management chip of the mobile phone controls its application processor to be powered on, the application processor controls the feedback component to switch from the low power mode to the running mode, and the application processor also starts related functional components in the mobile phone. At this time, the mobile phone is in a normal working state. If at this time, the mobile phone receives an incoming call, or a short message, etc., the feedback component of the mobile phone may give corresponding feedback information to prompt the user that the mobile phone has received a call or a text message.

Figure 5:
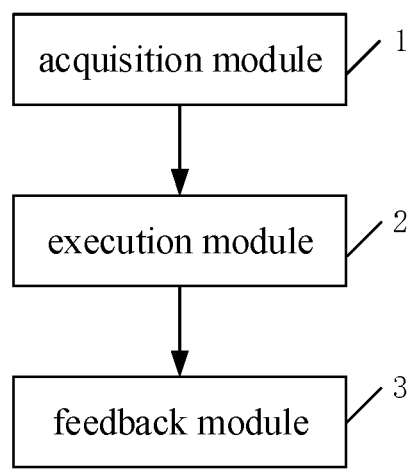
FIG. 5 illustrates a block diagram of an electronic device consistent with the disclosed embodiments.

According to the same concept as the boot method described above, as shown in FIG. 5, an electronic device provided in one embodiment includes: an acquisition module 1 for acquiring a boot signal; an execution module 2 for performing a booting process according to the boot signal; and a feedback module 3 for generating feedback provided to the boot signal according to the boot signal.

In one embodiment, the acquisition module 1 acquires the boot signal by the power management chip. The execution module 2 performs the booting process by the power management chip according to the boot signal. The acquisition module 1 acquires the boot signal by the feedback component. The feedback module 3 generates the feedback provided to the boot signal by the feedback component according to the boot signal.

In one embodiment, the power management chip operates in the low power mode to enable the booting process to be performed according to the boot signal. If the electronic device with the power management chip is in the power off state, the power management chip directly obtains power from the electronic device battery to support the power management chip to work in the low power mode. The feedback component operates in the low power mode so as to wake up and generate the feedback provided to the boot signal according to the boot signal. If the electronic device with the feedback component is in the power off state, the feedback component directly obtain power from the electronic device battery to support the feedback component to work in the low power mode.

In one embodiment, the feedback component is a vibration motor. The feedback component operates in the low power mode so as to wake up and generate feedback provided to the boot signal according to the boot signal. The feedback includes: the control chip of the vibration motor acquiring a boot signal; and the control chip reading a vibration waveform in its own memory according to the boot signal, and driving the vibration of the vibration motor according to the vibration waveform.

In one embodiment, the memory is a non-volatile memory so that the vibration waveform is not lost under the condition that the battery voltage is lower than a predetermined voltage. The vibration waveform is written to the nonvolatile memory when the electronic device is turned on at the first time, or the vibration waveform is pre-written to the non-volatile memory.

In one embodiment, the electronic device further includes the acquisition module 1 for acquiring the boot signal through a pressure sensing component. The boot signal acquired by the acquisition module 1 through the pressure sensing component includes: the pressure sensing component operating in the low power mode to obtain the sensing unit value at the first frequency, wherein, if the electronic device including the pressure sensing component is in the power off state, the pressure sensing component directly obtains power from the electronic device battery support the pressure sensing component to work in the low power mode; if the sensing unit value obtained at the first frequency satisfies the predetermined condition, switching to the operation in the normal operational mode, obtaining the sensing unit value at the second frequency and processing the value to determine the boot signal, wherein the sensing area of the pressure sensing component characterized by the predetermined condition has a user's finger.

In one embodiment, the execution module 2 performs the booting process by the power management chip according to the boot signal. The booting process includes the power management chip controlling the application processor to be powered on so as to enable the application processor to activate at least one functional component, which does not include the feedback component and the pressure sensing component.

In one embodiment, the application processor is provided for controlling the feedback component to switch from the low power mode to the running mode.

The electronic device provided in one embodiment has no physical pressing key. In the power off state, the pressure sensor and the vibration motor are kept directly connected to the battery to take power from the battery electrodes, and maintain the working state in low power state. Once the user presses the boot area of the electronic device, after the pressure sensor determines the boot signal, the boot signal can be outputted to the power manager and the control chip of the vibration motor at the same time. The control chip of the vibration motor immediately drives the motor vibration, so that the vibration feedback can be quickly given to indicate that the user's pressing operation on the booting area is successful and the electronic device is turned on. In one embodiment, the aging of the vibration feedback is less than or equal to the time when the electronic device triggers the screen to be lit according to the booting command.

The electronic devices described in the embodiments are the electronic devices corresponding to the boot methods described in the embodiments. Therefore, according to the boot methods in the embodiments, those skilled in the art can understand the specific implementation ways and their various variations. As long as those skilled in the art implements the electronic devices using the boot methods in the embodiments, the electronic devices belong to the protection scope of the present disclosure.

Those skilled in the art should understand that embodiments can be provided as methods, systems, or computer program products. Thus, the disclosure can take the form of an entirely hardware embodiment, an entirely software embodiment, or a combination of software and hardware. Moreover, the disclosure can take the form of a computer program product embodied on one or more computer-usable storage media (including but not limited to disk storage, CD-ROM, optical storage, etc.) containing computer usable program codes.

The present disclosure is described with reference to flowcharts and/or block diagrams of methods, apparatus (systems), and computer program products according to the embodiments in the present disclosure. It should be understood that each flow and/or block of the flowcharts and/or block diagrams and combination of flows and/or blocks of the flowcharts and/or block diagrams can be implemented by computer program commands. These computer program commands can be provided to a processor of a general-purpose computer, special purpose computer, embedded processor, or other programmable data processing device to generate a machine. The commands executed by a processor of a computer or other programmable data processing device are provided to generate a device for implementing the functions specified in one or more of the flows or blocks of one or more flowcharts or block diagrams.

The computer program commands can also be stored in a computer readable memory that can direct a computer or other programmable data processing device to operate in a specific way. As a result, the commands stored in the computer readable memory generate a manufactured product including the command device. The command device implements the functions specified in one or more flows of the flowchart or in one of more blocks of the block diagram.

These computer program commands can also be loaded into a computer or other programmable data processing device so that a series of operational steps are performed on the computer or the other programmable device to generate computer-implemented processing. The commands executed on the computer or the other programmable devices provide steps for implementing the functions specified in one or more flows of the flowchart or in one of more blocks of the block diagram.

The above embodiments are merely exemplary embodiments of the present disclosure, and are not intended to limit the present disclosure. The protection scope of the present disclosure is defined by the claims. Those skilled in the art may make various modifications or equivalent substitutions to the present disclosure within the spirit and the protection scope of the present disclosure. Such modifications or equivalents are also considered to be in the protection scope of the present disclosure.

What is claimed is:

1. A boot method for an electronic device having an application processor, a control chip, a power management chip and a feedback component including a vibration motor sensing a boot signal, the method comprising:

acquiring the boot signal by the power management chip from the vibration motor;
based on the boot signal, performing a booting process by the power management chip; and
based on the boot signal, generating a feedback to indicate the booting process by the feedback component;
wherein the control chip reads a vibration waveform in its own memory according to the boot signal, and drives the vibration motor to vibrate according to the vibration waveform, wherein the memory is a non-volatile memory such that the vibration waveform is not lost in a low power mode, and the vibration waveform is pre-written or written to the nonvolatile memory, and the control chip is not directly connected to the application processor, rather is directly connected to at least one battery and the feedback component is directly connected to at least one battery, not via the power management chip, to operate in the low power mode to enable the booting process and generating the feedback respectively, in response to the electronic device being in a power off state.

2. The boot method according to claim 1, wherein:
the electronic device further includes a pressure sensing component; and
the pressure sensing component acquires the boot signal.

3. The boot method according to claim 2, wherein:
the pressure sensing component operates in the low power mode to acquire a sensing unit value at a first frequency and, in response to the electronic device being in the power off state, the pressure sensing component directly obtains power from the battery to support the pressure sensing component to operate in the low power mode;
after the sensing unit value obtained at the first frequency satisfies a predetermined condition, the pressure sensing component switches to a normal operational mode, obtains a sensing unit value at a second frequency and processing the sensing unit value to determine the boot signal.

4. The boot method according to claim 2, wherein performing the booting process includes:
controlling, by the power management chip, an application processor to be powered on to enable the application processor to activate at least one functional component, wherein the at least one functional component is different from the feedback component or the pressure sensing component.

5. An electronic device, comprising:
a power management chip for acquiring a boot signal and, based on the boot signal, performing a booting process;
a feedback component for, based on the boot signal, generating a feedback provided to the boot signal to indicate the booting process, the feedback component including a vibration motor sensing the boot signal; and
a control chip for reading a vibration waveform in its own memory according to the boot signal, and drives the vibration motor to vibrate according to the vibration waveform, wherein the memory is a non-volatile memory such that the vibration waveform is not lost in a low power mode, and the vibration waveform is pre-written or written to the nonvolatile memory, and
wherein the control chip is not directly connected to the application processor, rather is directly connected to at least one battery and the feedback component is directly connected to at least one battery, not via the power management chip, to operate in the low power mode to enable the booting process and generating the feedback respectively, in response to the electronic device being in a power off state.

6. The electronic device according to claim 5, further comprising:
a pressure sensing component, the pressure sensing component acquires the boot signal.

7. The electronic device according to claim 6, wherein:
the pressure sensing component operates in the low power mode to acquire a sensing unit value at a first frequency and, in response to the electronic device being in the power off state, the pressure sensing component directly obtains power from the battery to support the pressure sensing component to operate in the low power mode;
after the sensing unit value obtained at the first frequency satisfies a predetermined condition, the pressure sensing component switches to a normal operational mode, obtains a sensing unit value at a second frequency and processing the sensing unit value to determine the boot signal.

8. The electronic device according to claim 6, wherein:
the power management chip controls an application processor to be powered on to enable the application processor to activate at least one functional component, wherein the at least one functional component is different from the feedback component or the pressure sensing component.

* * * * *